Figure 1:
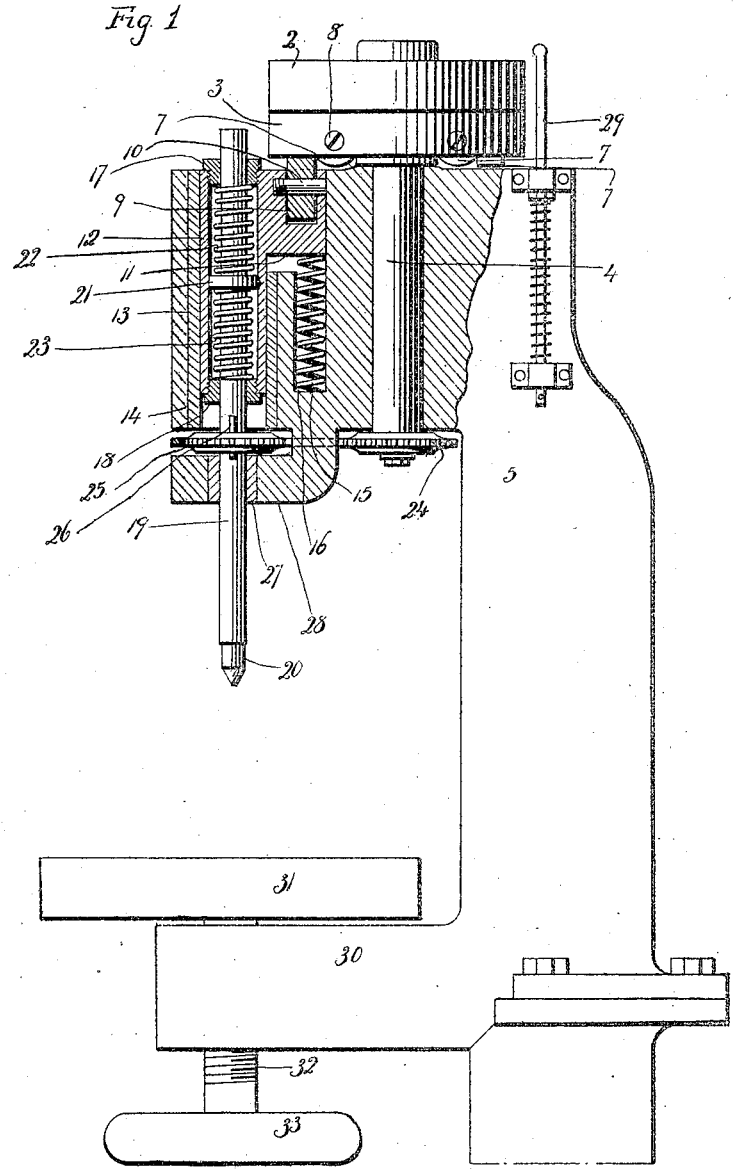

C. GREINER.
RIVETING MACHINE.
APPLICATION FILED MAR. 29, 1909.

942,637.

Patented Dec. 7, 1909.
2 SHEETS—SHEET 1.

Witnesses
Clara L. Reed
C. J. Reed

Inventor
Charles Greiner
by Seymour & Earle
Attys.

C. GREINER.
RIVETING MACHINE.
APPLICATION FILED MAR. 29, 1909.
942,637.
Patented Dec. 7, 1909.
2 SHEETS—SHEET 2.
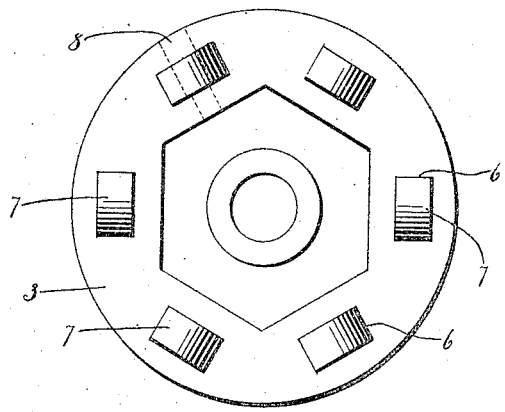
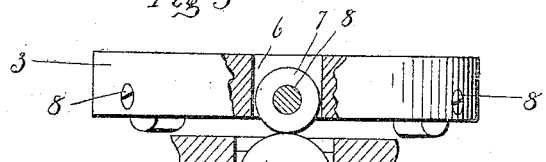
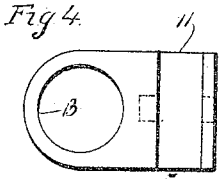
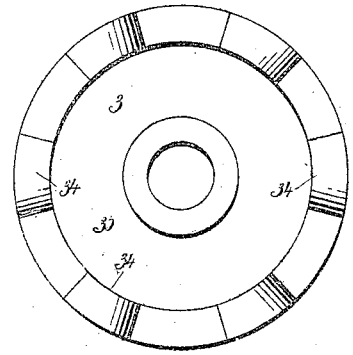

UNITED STATES PATENT OFFICE.

CHARLES GREINER, OF NEW HAVEN, CONNECTICUT.

RIVETING-MACHINE.

942,637.

Specification of Letters Patent.  Patented Dec. 7, 1909.

Application filed March 29, 1909. Serial No. 486,402.

*To all whom it may concern:*

Be it known that I, CHARLES GREINER, a citizen of the United States, residing at New Haven, in the county of New Haven and State of Connecticut, have invented a new and useful Improvement in Riveting-Machines; and I do hereby declare the following, when taken in connection with the accompanying drawings and the numerals of reference marked thereon, to be a full, clear, and exact description of the same, and which said drawings constitute part of this specification, and represent, in—

Figure 1 a broken view partly in side elevation, and partly in vertical section of a riveting machine constructed in accordance with my invention. Fig. 2 a detached reverse view of the fixed pulley showing the rollers mounted therein. Fig. 3 a broken view showing how the rollers in the pulley co-act with the roller in the reciprocating plunger. Fig. 4 a detached plan view of the reciprocating plunger. Fig. 5 a reverse plan view of a pulley or revolving head provided upon its lower face with a circular series of cam-like projections taking the place of the rollers shown in the other figures.

My invention relates to an improvement in riveting machines, the object being to produce a simple, compact and effective machine having a great capacity for work.

With these ends in view my invention consists in the construction and combination of parts as hereinafter described and pointed out in the claims.

In carrying out my invention as herein shown, I mount a loose pulley 2 and a fixed pulley 3 upon a shaft 4 journaled in an upright position in the frame 5 of the machine, the said pulleys 2 and 3 being located in a horizontal plane and the fixed pulley, forming, as it were, a revolving head. The fixed pulley 3 which is located underneath the loose pulley 2, is formed upon its lower face with a circular series of recesses 6 for the reception of a circular series of rollers 7 mounted upon screws 8 radially arranged with respect to the center of the pulley as shown in Fig. 2. These rollers which act as hammers, collide, so to speak, one after the other as the pulley 3 revolves, with a roller 9 mounted upon a screw 10 in an arm or lug 11 offsetting from the upper end of a chambered plunger 12 vertically reciprocating in a Babbitt metal bushing 13 located in a vertical chamber 14 in the frame 5. Normally the plunger 12 is held at the limit of its upward movement, by a helical spring 15 abutting at its upper end against the lower face of the said arm 11 and located in a chamber 16 in the frame 5. The upper and lower ends of the plunger 12 are threaded for the reception of removable bushings 17 and 18 forming bearings for the shaft-like hammer 19 which is furnished at its lower end with a die 20 by which the actual riveting is done. The said hammer 19 is provided with a collar 21 forming an abutment for upper and lower cushioning springs 22 and 23, the spring 22 being abutted at its upper end against the bushing 17, and the spring 23 being abutted at its lower end against the bushing 18 and the adjacent ends of the said springs respectively bearing on the opposite faces of the collar 21. A sprocket-wheel 24 mounted on the lower end of the shaft 4 is connected by a sprocket chain 36, with a sprocket-wheel 25 rotating with the hammer 19 with which it is connected by a key 26 which permits the hammer to reciprocate through it. At its lower end the hammer is mounted in a bushing 27 located in an arm 28 formed by recessing the frame 5 for the reception of the sprocket 25. The machine is also provided with the usual belt-shipper 29 which needs no description. A horizontal arm 30 of the frame 5 carries a table 31 on which the work is placed and which is made adjustable by a screw 32 and hand wheel 33.

If desired, the rollers might be fixed against rotation in which case they would form cam-like obstructions striking the roller 9 in the same manner as if rotatable. Or the rollers might be replaced by a circular series of cam-like obstructions 34 located upon the lower face of the fixed pulley 35 as shown in Fig. 5.

I claim:

1. In a riveting machine, the combination with a revolving head, of a circular series of rollers mounted therein so as to project beyond one face thereof, a spring-actuated chambered plunger provided with an offsetting arm, a roller mounted in the said arm in position to be struck by the rollers in the head as the same revolves, and a spring-cushioned hammer carried by the said plunger.

2. In a riveting machine, the combination with a revolving head, of a shaft upon which the same is mounted, a sprocket-wheel carried by the said shaft and rotating with the said head, a circular series of rollers mounted in the said head so as to project beyond one face thereof, a spring-actuated chambered plunger provided with an offsetting arm, a roller mounted in the said arm in position to be engaged by the rollers carried by the head as the same is revolved, a spring-cushioned hammer mounted in the said plunger, a sprocket mounted upon the said hammer for rotation therewith, and connection between the two sprockets mentioned, whereby the hammer is rotated.

3. In a riveting machine, the combination with a fixed and a loose pulley, of a circular series of rollers mounted in the lower face of the fixed pulley which is located below the loose pulley, a spring-actuated plunger having an offsetting arm, a roller mounted in the said arm in position to be engaged in succession by the rollers mounted in the fixed pulley as the same revolves, a cushioning hammer mounted in the said plunger, and means for rotating the said hammer from the said fixed pulley.

4. In a riveting machine, the combination with a head revolving in a horizontal plane and provided upon its lower face with a circular series of cam-like obstructions, of a vertically arranged spring-actuated chambered plunger formed with an inwardly extending offsetting arm, a roller mounted in the said arm in position to be struck by the cam-like obstructions in the lower face of the head, a spring-cushioned hammer carried by the said plunger, and means for rotating the hammer.

In testimony whereof, I have signed this specification in the presence of two subscribing witnesses.

CHARLES GREINER.

Witnesses:
CHARLES GREINER, Jr.,
CHARLES KERN.